US009777540B2

(12) United States Patent
Downie et al.

(10) Patent No.: US 9,777,540 B2
(45) Date of Patent: Oct. 3, 2017

(54) DRILLING MOTOR WITH ONE-WAY ROTARY CLUTCH

(71) Applicant: Halliburton Energy Services, Inc., Houston, TX (US)

(72) Inventors: Andrew M. Downie, Alloa (GB); Christopher P. Crampton, Alloa (GB)

(73) Assignee: Halliburton Energy Services, Inc., Houston, TX (US)

( * ) Notice: Subject to any disclaimer, the term of this patent is extended or adjusted under 35 U.S.C. 154(b) by 53 days.

(21) Appl. No.: 14/423,683

(22) PCT Filed: Oct. 16, 2012

(86) PCT No.: PCT/US2012/060345
§ 371 (c)(1),
(2) Date: Feb. 24, 2015

(87) PCT Pub. No.: WO2014/062158
PCT Pub. Date: Apr. 24, 2014

(65) Prior Publication Data
US 2015/0240569 A1    Aug. 27, 2015

(51) Int. Cl.
*E21B 17/04*   (2006.01)
*E21B 4/02*   (2006.01)
*F16D 41/069*   (2006.01)

(52) U.S. Cl.
CPC ............. *E21B 17/04* (2013.01); *E21B 4/02* (2013.01); *F16D 41/069* (2013.01)

(58) Field of Classification Search
CPC .......... E21B 17/04; F16D 41/69; F16D 41/07; F16D 2300/22
See application file for complete search history.

(56) References Cited

U.S. PATENT DOCUMENTS 2,123,364 A * 7/1938 Katterjohn ............. E21B 44/08
173/113
2,167,019 A   7/1939 Yost
(Continued)

FOREIGN PATENT DOCUMENTS

CA   2256069   6/2000
EP   0601916   6/1994
(Continued)

OTHER PUBLICATIONS

International Search Report and Written Opinion of PCT Application No. PCT/US2012/060435 dated Jul. 4, 2013: pp. 1-18.

*Primary Examiner* — Huan Le
*Assistant Examiner* — Lori Wu
(74) *Attorney, Agent, or Firm* — Chamberlain Hrdlicka (57) ABSTRACT

A drilling motor assembly can include a housing, a shaft, and a pawl which selectively engages a recess, the pawl having an axis of rotation and a generally planar engagement face which engages a generally planar engagement face of the recess when relative rotation between the housing and the shaft is prevented. The engaged engagement faces can be oblique relative to a radius extending from the axis of rotation to the engaged engagement faces. A method of drilling a wellbore can include flowing a fluid through a drilling motor assembly, thereby rotating a shaft relative to a housing, and rotating the housing, thereby engaging a pawl with a recess and preventing relative rotation between the housing and the shaft, the pawl and recess each having a generally planar engagement face, whereby the engaged engagement faces prevent relative rotation between the shaft and the housing.

31 Claims, 5 Drawing Sheets

(56) References Cited

U.S. PATENT DOCUMENTS

| | | | |
|---|---|---|---|
| 4,126,214 A * | 11/1978 | Kiss | F16D 41/14 |
| | | | 192/36 |
| 4,187,918 A | 2/1980 | Clark | |
| 4,232,751 A | 11/1980 | Trzeciak | |
| 4,253,532 A | 3/1981 | Geczy | |
| 4,276,944 A | 7/1981 | Geczy | |
| 4,632,193 A | 12/1986 | Geczy | |
| 5,168,941 A | 12/1992 | Krueger et al. | |
| 5,257,685 A * | 11/1993 | Tichiaz | F02N 15/027 |
| | | | 192/104 C |
| 5,350,242 A | 9/1994 | Wenzel | |
| 5,437,338 A | 8/1995 | Martin et al. | |
| 5,875,859 A | 3/1999 | Ikeda et al. | |
| 6,092,610 A | 7/2000 | Kosmala et al. | |
| 7,287,607 B1 | 10/2007 | Falgout, Sr. | |
| 2005/0173155 A1 | 8/2005 | Nevlud et al. | |
| 2005/0178558 A1 | 8/2005 | Kolle et al. | |
| 2006/0021841 A1 | 2/2006 | Kimes et al. | |
| 2008/0264692 A1 | 10/2008 | Underwood et al. | |
| 2011/0214963 A1 | 9/2011 | Beylotte et al. | |
| 2011/0266859 A1 * | 11/2011 | Greenspan | E21C 35/183 |
| | | | 299/10 |

FOREIGN PATENT DOCUMENTS

| | | |
|---|---|---|
| EP | 1988252 | 11/2008 |
| GB | 2055927 | 3/1981 |
| SU | 737615 | 5/1980 |
| SU | 1218195 | 3/1986 |
| WO | 0104451 | 1/2001 |
| WO | 2005003505 | 1/2005 |

* cited by examiner

DRILLING MOTOR WITH ONE-WAY ROTARY CLUTCH

TECHNICAL FIELD

This disclosure relates generally to equipment utilized and operations performed in conjunction with drilling a subterranean well and, in one example described below, more particularly provides a drilling motor with a one-way rotary clutch.

BACKGROUND

A turbine drilling motor produces rotary motion in response to flow of drilling fluid through the motor. In general, turbine drilling motors are used when relatively high rotational speed at relatively low torque is desired, when drilling complex wellbore trajectories, etc.

Unfortunately, if a drill bit rotated by a typical turbine drilling motor becomes stuck, the drill bit cannot be rotated by rotating a section of a drill string above the drilling motor. This can make it very difficult to free a stuck drill bit.

Therefore, it will be appreciated that improvements are continually needed in the arts of constructing and operating drilling motors. Such improvements may be used with drilling motors other than turbine-type drilling motors.

DETAILED DESCRIPTION

Figure 1:
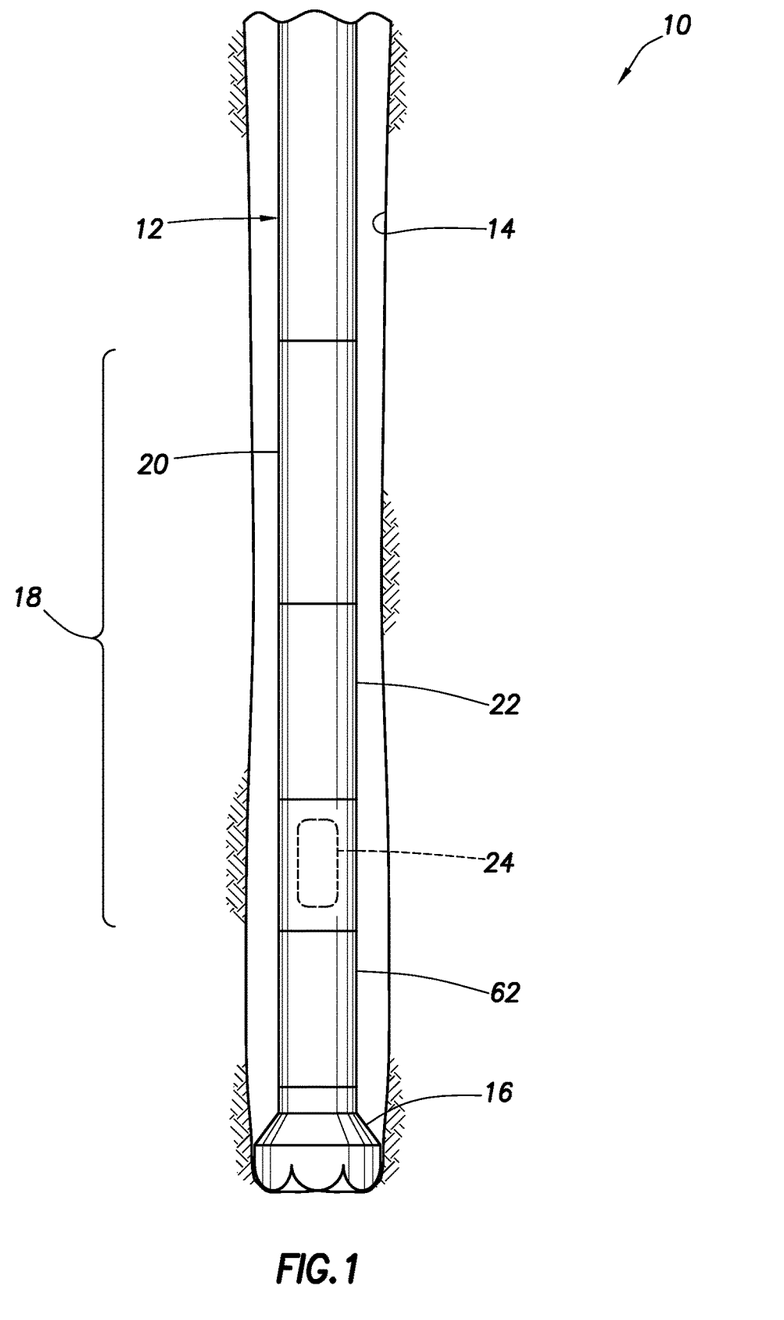
FIG. 1 is a representative partially cross-sectional view of a well system and associated method which can embody principles of this disclosure.

Representatively illustrated in FIG. 1 is a system 10 for use with a subterranean well, and an associated drilling method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a drill string 12 is used to drill a wellbore 14. For this purpose, a drill bit 16 is connected at a distal end of the drill string 12. The drill bit 16 can be rotated by flowing fluid (such as drilling fluid, sometimes known as drilling "mud") through a drilling motor assembly 18 connected in the drill string 12.

The drilling motor assembly 18 can include a drilling motor 20 and a bearing and seal device 22. Preferably, the drilling motor 20 comprises a turbine drilling motor, but other types of drilling motors (e.g., positive displacement, Moineau-type, etc.) may be used, if desired.

In this example, the drilling motor assembly 18 also includes a one-way rotary clutch 24, which permits the drill bit 16 to be rotated by rotating the drill string 12 above the assembly 18 (e.g., by using a rotary table, top drive, another drilling motor, etc.). Although the clutch 24 is depicted in FIG. 1 as being positioned between the bearing/seal device 22 and the drill bit 16, in other examples the clutch could be part of the bearing/seal device, part of the drilling motor 20, or otherwise positioned.

Other components, such as a steering tool 62, could also be included in the drill string 12. In that case, the one-way rotary clutch 24 could be part of the steering tool 62. The scope of this disclosure is not limited to any particular combination, arrangement or configuration of components of the assembly 18 or drill string 12.

The capability of rotating the drill bit 16 by rotating the drill string 12 above the assembly 18 can be useful, for example, if the drill bit becomes stuck and cannot be rotated by flowing fluid through the drilling motor 20. Rotating of the drill bit 12 by rotating the drill string 12 can be used to dislodge the drill bit 16, so that drilling operations can continue.

However, the scope of this disclosure is not limited to any particular purpose for which the one-way clutch 24 is used in the assembly 18. The one-way clutch 24 can be used in a variety of different ways to prevent relative rotation between the drill bit 16 and the drill string 12 above the assembly 18 in one rotary direction, while allowing relative rotation between the drill bit and the drill string above the assembly in an opposite rotary direction.

Figure 2:
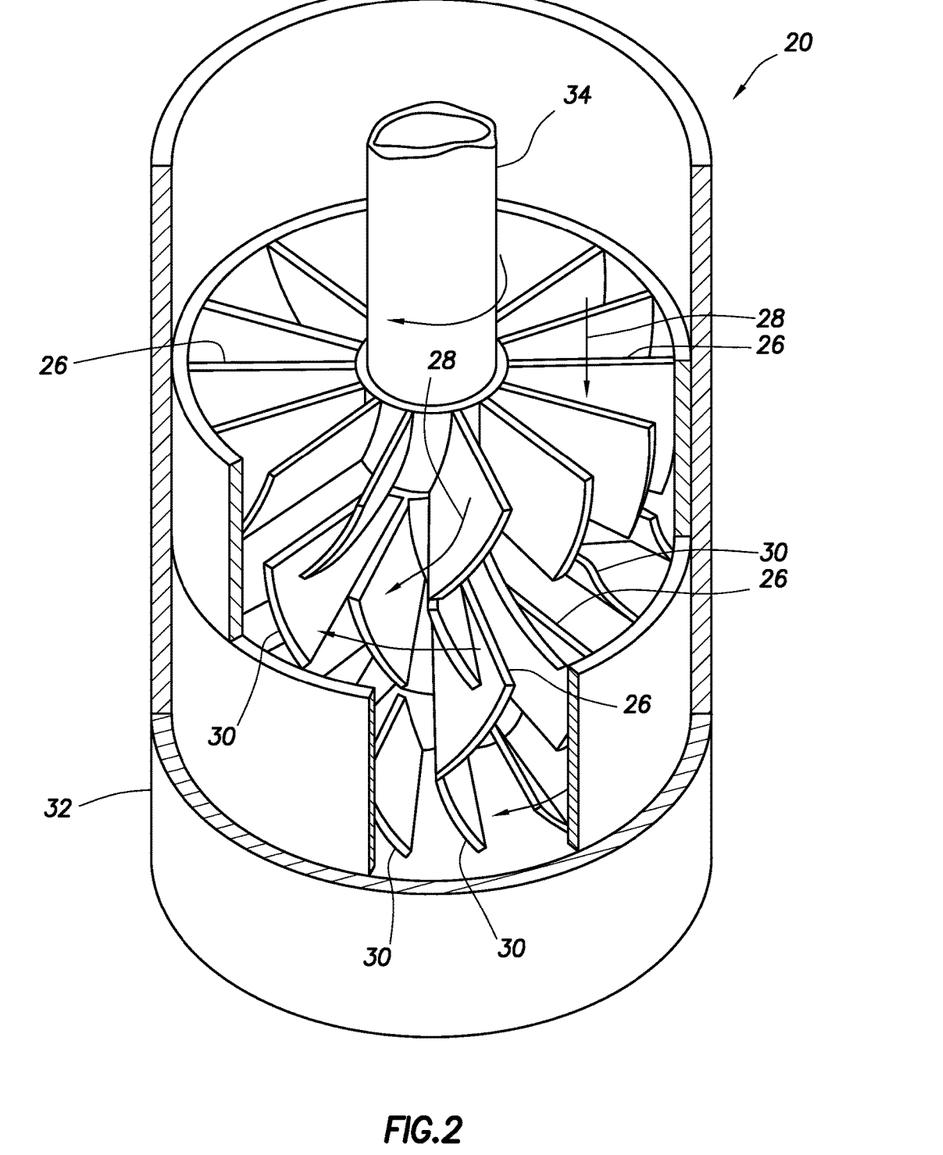
FIG. 2 is an enlarged scale representative partially cross-sectional perspective view of a section of a turbine drilling motor which can embody the principles of this disclosure.

Referring additionally now to FIG. 2, an enlarged scale partially cross-sectional view of a power section of the drilling motor 20 is representatively illustrated. In this view, it may be more clearly seen that the drilling motor 20 preferably includes stator vanes 26 which direct fluid 28 to impinge on rotor vanes 30. The stator vanes 26 are secured relative to an outer housing 32, and the rotor vanes 30 are secured relative to an inner shaft 34.

In normal operation, the fluid 28 is flowed through the drilling motor 20, thereby causing the rotor vanes 30 and shaft 34 to rotate relative to the stator vanes 26 and outer housing 32. The shaft 34 is connected to the drill bit 16, so that the drill bit is rotated in response to flow of the fluid 28 through the drilling motor 20.

Note that FIG. 2 illustrates a turbine-type drilling motor 20, and two sets of stator and rotor vanes 26, 30 are depicted for rotating the shaft 34 relative to the housing 32. However, in other examples, other types of drilling motors may be used, any number of stator and rotor vanes 26, 30 may be used, the housing 32 and shaft 34 may be made up of multiple interconnected elements, etc. Thus, it should be understood that the scope of this disclosure is not limited at all to any of the particular details of the drilling motor 20 as depicted in the drawings or described herein.

Figure 3:
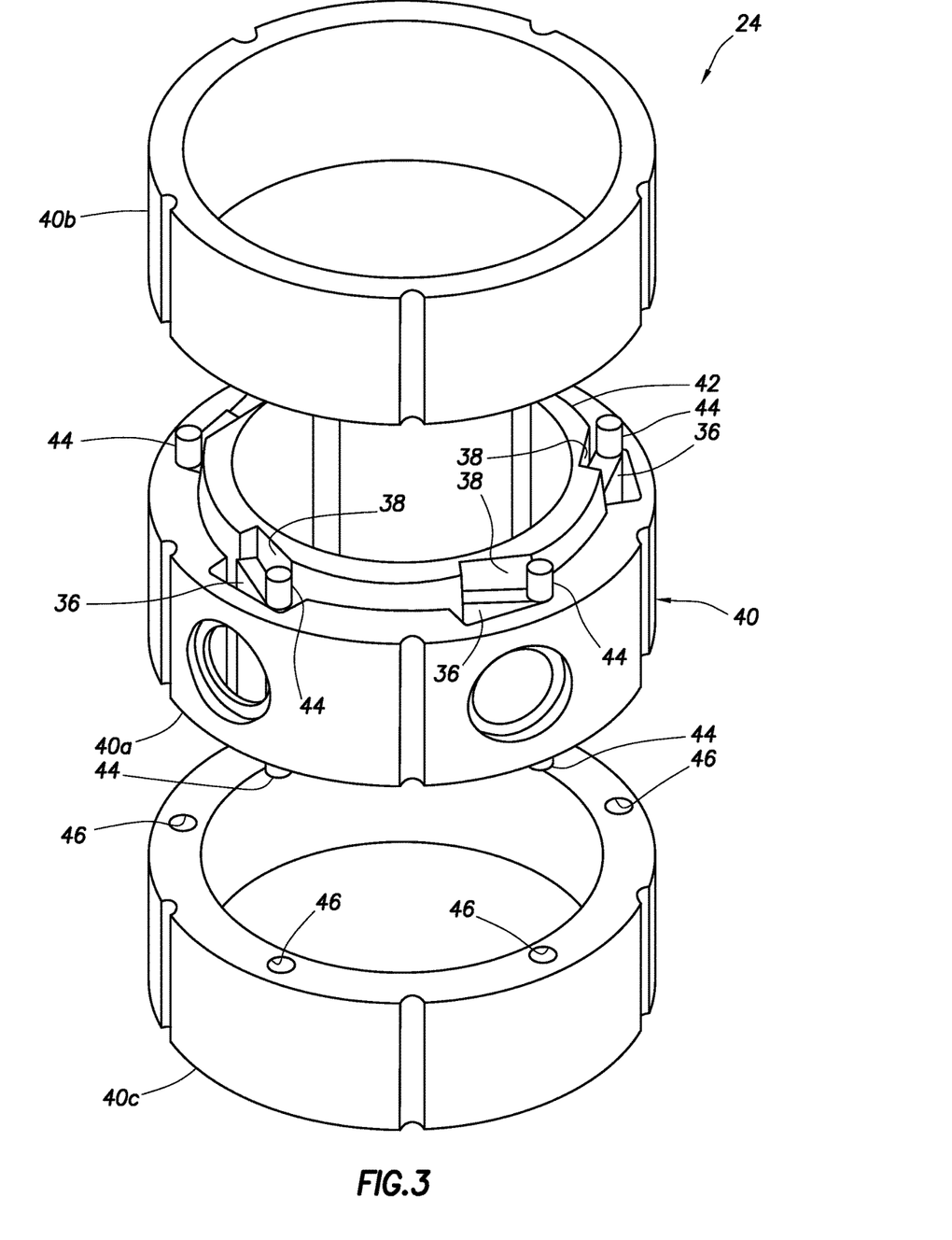
FIG. 3 is a further enlarged scale representative exploded perspective view of a one-way rotary clutch which may be used in the drilling motor, and which can embody the principles of this disclosure.

Referring additionally now to FIG. 3, a further enlarged scale exploded view of the one-way rotary clutch 24 is representatively illustrated. In this view, it may be seen that the clutch 24 includes multiple pivotably supported pawls 36 which engage complementarily shaped recesses 38, in order to prevent relative rotation between a housing 40 and an inner mandrel 42.

The housing 40 in this example is provided in three sections 40a,b,c and is secured relative to the housing 32 of the drilling motor 20. In other examples, the housings 32, 40 could be a same housing, or merely different sections of a same housing assembly. The mandrel 42 is secured relative to the shaft 34. Thus, relative rotation between the housing 40 and the mandrel 42 corresponds to relative rotation between the housing 32 and the shaft 34 of the drilling motor 20.

It will be appreciated that, if the mandrel 42 is rotated clockwise (as viewed from the top of FIG. 3) relative to the housing 40, for example, by the drilling motor 20, the pawls 36 will be pivoted out of engagement with the recesses 38, thereby permitting such relative rotation. The pawls 36 pivot about pivot pins 44 provided on opposite sides of the pawls. The pivot pins 44 are received in openings 46 formed in the housing sections 40*b,c*.

If the housing 40 is rotated clockwise relative to the mandrel 42, for example, by rotating the drill string 12 above the drilling motor assembly 18, the pawls 36 will pivot into engagement with the recesses 38 and prevent such relative rotation. Thus, the clutch 24 permits clockwise rotation of the mandrel 42 and shaft 34 relative to the housings 32, 40, but prevents counter-clockwise rotation of the mandrel and shaft relative to the housings.

Figure 4:
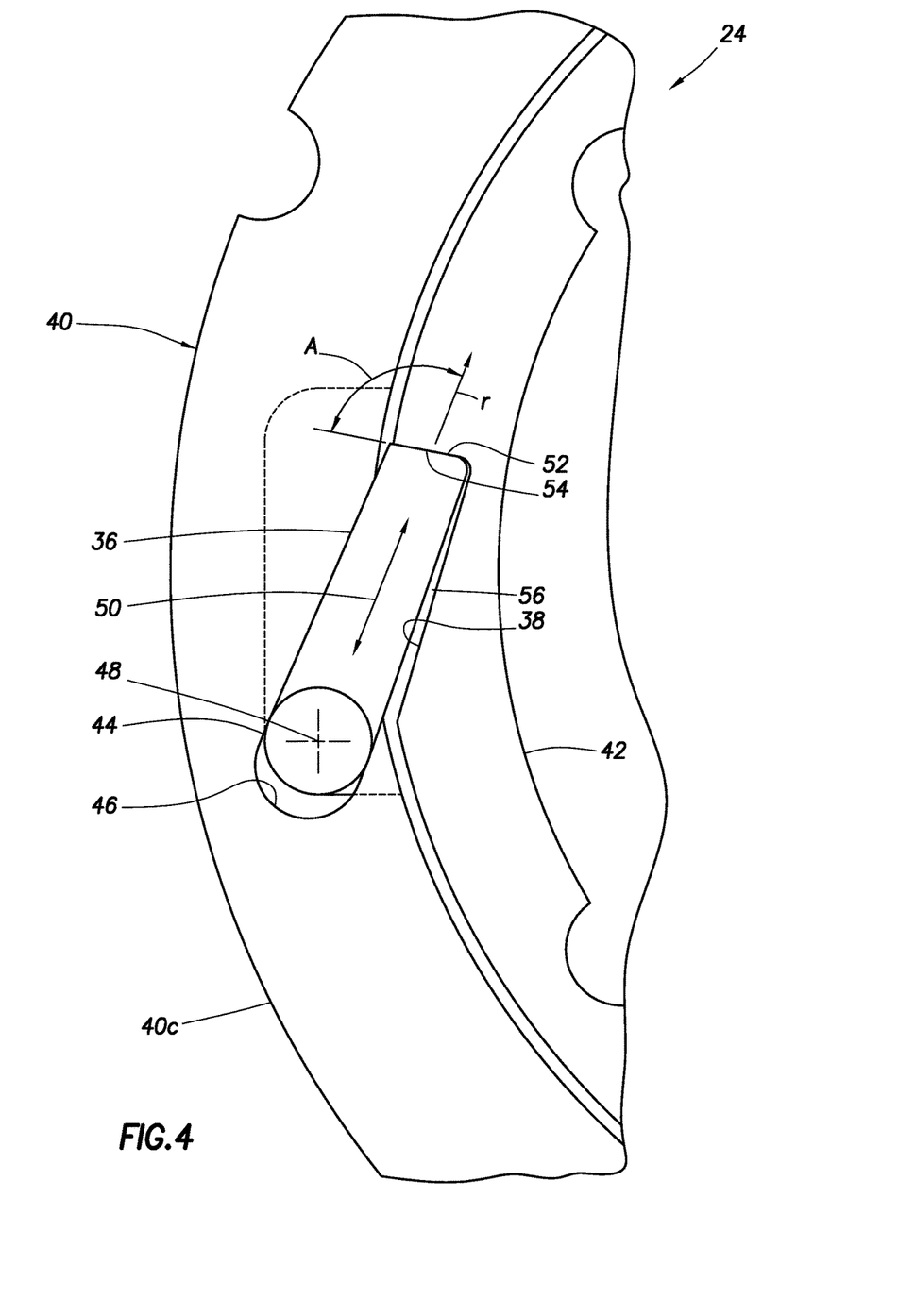
FIG. 4 is a still further enlarged scale representative cross-sectional view of a section of the one-way rotary clutch.

Referring additionally now to FIG. 4, a portion of the clutch 24 is representatively illustrated at an enlarged scale. This view is from an end of a pawl 36, showing how the pawl pivots about an axis of rotation 48 relative to the housing 40.

Note that the opening 46 in the housing section 40*c* is elongated, so that a compressive force 50 applied to the pawl 36 when it prevents counter-clockwise rotation of the mandrel 42 relative to the housing 40 is not transmitted via the pivot pin 44 to the housing section 40*c*. The openings 46 in the housing section 40*b* are preferably also shaped in this manner.

Thus, when torque is transmitted between the housing 40 and the mandrel 42 (e.g., when engagement between the pawl 36 and the recess 38 prevents counter-clockwise rotation of the mandrel relative to the housing, or clockwise rotation of the housing relative to the mandrel), the pivot pins 44 are not required to react the compressive force 50. Instead, the compressive force 50 is reacted by the housing section 40*a* where it contacts the pawl 36. This prevents premature wear of the pivot pins 44 and distributes the force across a body of the pawl 36 between the pivot pins.

Note, also, that a generally planar engagement face 52 on the pawl 36 engages another generally planar engagement face 54 on the mandrel 42. This engagement between the planar engagement faces 52, 54 functions to distribute contact pressure resulting from the engagement across the planar faces, thereby reducing the contact pressure.

Furthermore, a wedge-shaped space 56 is formed between the pawl 36 and a bottom of the recess 38 to "trap" fluid between the pawl and the recess. This "trapped" fluid is increasingly squeezed between the pawl 36 and the bottom of the recess 38 when the mandrel 42 rotates clockwise relative to the housing 40, thereby producing hydrodynamic pressure between the pawl and the recess 38. This hydrodynamic pressure reduces contact pressure between the pawl 36 and the recess 38 when the shaft 34 and mandrel 42 are being rotated at relatively high speed by the drilling motor 20.

Similarly, hydrodynamic pressure is generated between the pawl 36 and an outer diameter of the mandrel 42 when the mandrel rotates clockwise relative to the housing 40. This hydrodynamic pressure reduces contact pressure between the pawl 36 and the mandrel 42 when the shaft 34 and mandrel are being rotated at relatively high speed by the drilling motor 20.

Figure 5:
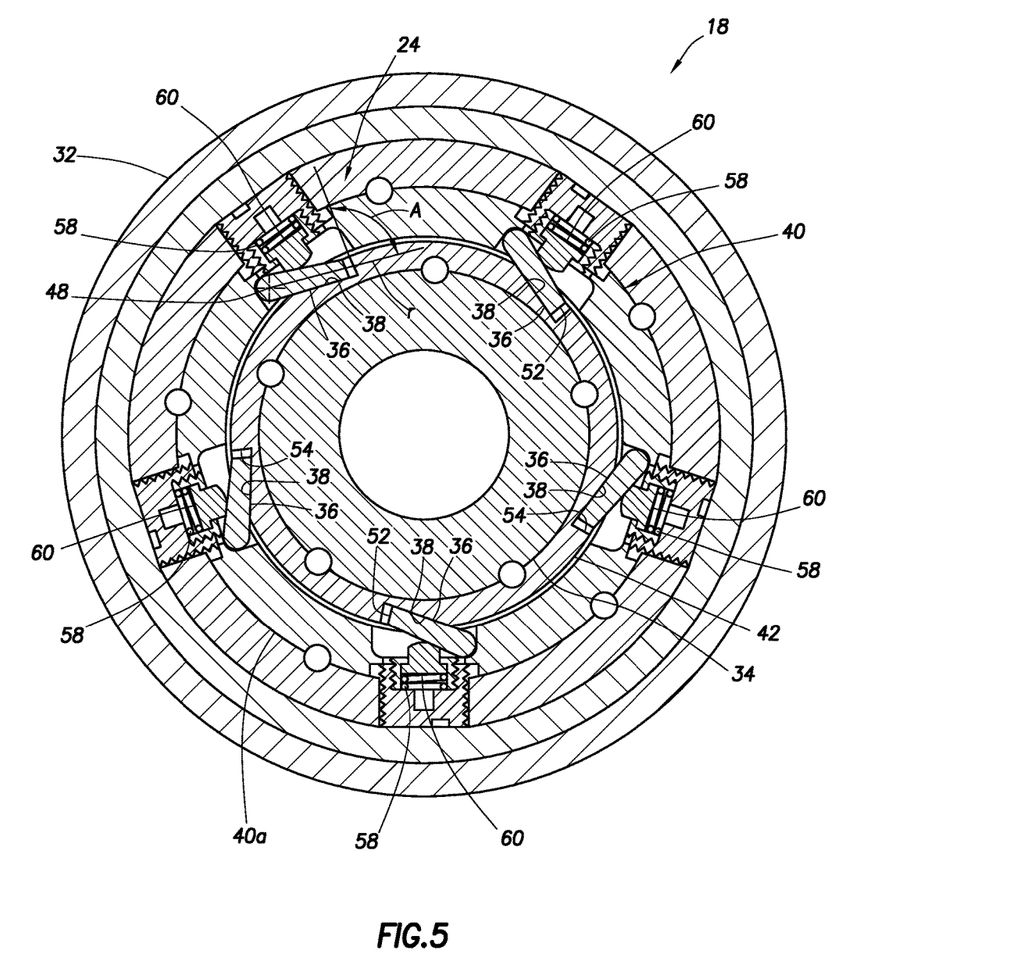
FIG. 5 is a representative cross-sectional view of the one-way rotary clutch in the drilling motor.

Referring additionally now to FIG. 5, a cross-sectional view of the one-way rotary clutch 24 in the drilling motor assembly 18 is representatively illustrated. In this view, a manner in which the pawls 36 are biased into engagement with the recesses 38 by biasing devices 58 (such as coiled springs, leaf springs, elastomers, compressed fluid, etc.) can be clearly seen.

Biasing forces are transmitted from the biasing devices 58 to the pawls 36 via "buttons" 60. Preferably, mating surfaces on the buttons 60, housing section 40*a*, pivot pins 44, housing sections 40*b,c*, recess 38, etc. are suitably treated to withstand repeated rubbing, impacts, etc. For example, the mating surfaces could be hardened to 400 Brinell hardness or greater, could be formed of tungsten carbide or another high hardness material, could be coated (e.g., using chemical vapor deposition, etc.), or otherwise prepared for relatively high speed rubbing and/or impacts.

Note that an angle A between the engagement surfaces 52, 54 and a radius r extending along the pawl 36 from the axis of rotation 48 is greater than ninety degrees (also depicted in FIG. 4). When the engagement faces 52, 54 are engaged (e.g., when the clutch 24 prevents counter-clockwise rotation of the shaft 34 and mandrel 42 relative to the housings 32, 40) this oblique angle A will prevent the pawl 36 from disengaging from the recess 38, particularly when a relatively large torque is transmitted from the housings 32, 40 to the shaft 34 via the mandrel 42 (for example, to free a stuck drill bit 16).

It may now be fully appreciated that the above disclosure provides significant advancements to the arts of constructing and operating drilling motors used for drilling wells. In examples described above, the one-way rotary clutch 24 allows the drilling motor 20 to be used to rotate the drill bit, and also allows the drill string 12 above the drilling motor assembly 18 to be rotated to rotate the drill bit 16.

A drilling motor assembly 18 is provided to the art by the above disclosure. In one example, the drilling motor assembly 18 can include a housing 32, a shaft 34, and at least one pawl 36 which selectively engages at least one recess 38. The pawl 36 has an axis of rotation 48 and a generally planar engagement face 52 which engages a generally planar engagement face 54 of the recess 38 when relative rotation between the housing 32 and the shaft 34 is prevented. The engaged pawl and recess engagement faces 52, 54 are oblique relative to a radius r extending from the axis of rotation 48 to the engaged pawl and recess engagement faces 52, 54.

In some examples described above, relative rotation between the housing 32 and the shaft 34 is permitted in one direction, but is prevented in an opposite direction due to the engaged pawl and recess engagement faces 52, 54.

The pawl 36 can rotate about a pivot pin 44. The pivot pin 44 may be received in a slotted opening 46, whereby the pivot pin 44 does not transmit torque between the housing 32 and the shaft 34 when relative rotation between the housing 32 and the shaft 34 is prevented. A compressive force 50 can be transmitted between the housing 32 and the shaft 34 via the pawl 36, without the compressive force 50 being reacted by the pivot pin 44.

In some examples, the pawl 36 rotates with the housing 32, and the recess 38 rotates with the shaft 34.

The pawl 36 can rotate out of engagement with the recess 38 when relative rotation between the housing 32 and the shaft 34 is permitted.

Hydrodynamic pressure may reduce contact pressure between the pawl 36 and the recess 38 when relative rotation between the housing 32 and the shaft 34 is permitted.

The engaged pawl and recess engagement faces 52, 54 can be oriented at an angle A of greater than 90 degrees relative to the radius r.

The drilling motor assembly 18 can include a turbine drilling motor 20 which rotates the shaft 34 in response to fluid flow through the drilling motor 20.

A method of drilling a wellbore 14 is also described above. In one example, the method can comprise: flowing a drilling fluid 28 through a drilling motor assembly 18, thereby rotating a shaft 34 relative to a housing 32; and rotating the housing 32, thereby engaging at least one pawl 36 with at least one recess 38 and preventing relative rotation between the housing 32 and the shaft 34, the pawl 36 and recess 38 each having a generally planar engagement face 52, 54, whereby the engaged engagement faces 52, 54 prevent relative rotation between the shaft 34 and the housing 32. The drilling motor 20 may be a turbine drilling motor.

A drilling motor assembly 18 described above can include a drilling motor 20 which rotates a shaft 34 relative to a housing 32 in response to fluid 28 flow through the drilling motor 20, and at least one pawl 36 which selectively engages at least one recess 38 to selectively prevent relative rotation between the shaft 34 and the housing 32. The pawl 36 rotates about a pivot pin 44, and a compressive force 50 is transmitted between the housing 32 and the shaft 34 via the pawl 36, without the compressive force 50 being reacted by the pivot pin 44.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A drilling motor assembly, comprising:
    a housing;
    a mandrel comprising a recess;
    a pawl which selectively engages the recess, the pawl having an axis of rotation and a generally planar engagement face which is engagable with a generally planar engagement face of the recess, and wherein when the pawl and the recess are engaged, the engagement faces are oriented at an oblique angle relative to a radius extending from the axis of rotation to the engaged pawl and recess engagement faces; and
    wherein the pawl is rotatable about a pivot pin received in an elongated opening such that the pivot pin is spaced from the housing along the elongated opening, whereby the pivot pin does not transmit torque between the housing and the mandrel when relative rotation between the housing and the mandrel is prevented.

2. The drilling motor assembly of claim 1, wherein the pawl and the recess are engagable such that relative rotation between the housing and the mandrel is permitted in one direction, but is prevented in an opposite direction.

3. The drilling motor assembly of claim 1, wherein a compressive force is transmitted between the housing and the mandrel via the pawl, without the compressive force being reacted by the pivot pin.

4. The drilling motor assembly of claim 1, wherein the pawl rotates with the housing, and wherein the recess rotates with the mandrel.

5. The drilling motor assembly of claim 1, wherein the pawl rotates out of engagement with the recess when relative rotation between the housing and the mandrel is permitted.

6. The drilling motor assembly of claim 1, wherein hydrodynamic pressure reduces contact pressure between the pawl and the recess when relative rotation between the housing and the mandrel is permitted.

7. The drilling motor assembly of claim 1, wherein the oblique angle is greater than 90 degrees relative to the radius and the engagement faces such that when the pawl and recess engagement faces are engaged, the pawl is prevented from disengaging from the recess.

8. The drilling motor assembly of claim 1, further comprising a turbine drilling motor which rotates the mandrel in response to fluid flow through the drilling motor.

9. The drilling motor assembly of claim 1, wherein predetermined mating surfaces of the drilling motor assembly are hardened to at least approximately 400 Brinell hardness.

10. A method of drilling a wellbore, comprising:
    flowing a drilling fluid through a drilling motor assembly, thereby rotating a mandrel relative to a housing; and
    rotating the housing, thereby engaging a pawl with a recess in the mandrel and preventing relative rotation between the housing and the mandrel, the pawl and recess each having a generally planar engagement face, whereby the engaged engagement faces prevent relative rotation between the mandrel and the housing, wherein the pawl rotates about a pivot pin received in an elongated opening such that the pivot pin is spaced from the housing along the elongated opening and when a force is transmitted between the housing and the mandrel via the pawl, the force is not transmitted to the pivot pin.

11. The method of claim 10, wherein the pawl has an axis of rotation, and wherein the engaged pawl and recess engagement faces are oriented at an oblique angle relative to a radius extending from the axis of rotation to the engaged pawl and recess engagement faces.

12. The method of claim 11, wherein the oblique angle is greater than 90 degrees relative to the radius and the engagement faces such that when the pawl and recess engagement faces are engaged, the pawl is prevented from disengaging from the recess.

13. The method of claim 10, wherein relative rotation between the housing and the mandrel is permitted in one direction, but is prevented in an opposite direction due to the engaged pawl and recess engagement faces.

14. The method of claim 10, wherein the elongated opening is formed in the housing.

15. The method of claim 14, whereby the pivot pin does not transmit torque between the housing and the mandrel when relative rotation between the housing and the mandrel is prevented.

16. The method of claim 14, wherein the force is a compressive force transmitted between the housing and the mandrel via the pawl, without the compressive force being reacted by the pivot pin.

17. The method of claim 10, wherein the pawl rotates with the housing, and wherein the recess rotates with the mandrel.

18. The method of claim 10, wherein the pawl rotates out of engagement with the recess when relative rotation between the housing and the mandrel is permitted.

19. The method of claim 10, wherein hydrodynamic pressure reduces contact pressure between the pawl and the recess when relative rotation between the housing and the mandrel is permitted.

20. The method of claim 10, wherein the drilling motor comprises a turbine drilling motor.

21. The method of claim 10, further comprising hardening predetermined mating surfaces of the drilling motor assembly to at least approximately 400 Brinell hardness.

22. A drilling motor assembly, comprising:
a drilling motor which rotates a mandrel relative to a housing in response to fluid flow through the drilling motor; and
a pawl which selectively engages a recess in the mandrel to selectively prevent relative rotation between the mandrel and the housing, wherein the pawl is rotatable about a pivot pin received in an elongated opening such that the pivot pin is spaced from the housing along the elongated opening and when a compressive force is transmitted between the housing and the mandrel via the pawl, the compressive force is not transmitted to the pivot pin.

23. The drilling motor assembly of claim 22, wherein the elongated opening is formed in the housing, whereby the pivot pin does not transmit torque between the housing and the mandrel when relative rotation between the housing and the mandrel is prevented.

24. The drilling motor assembly of claim 22, wherein the pawl rotates with the housing, and wherein the recess rotates with the mandrel.

25. The drilling motor assembly of claim 22, wherein the pawl rotates out of engagement with the recess when relative rotation between the housing and the mandrel is permitted.

26. The drilling motor assembly of claim 22, wherein hydrodynamic pressure reduces contact pressure between the pawl and the recess when relative rotation between the housing and the mandrel is permitted.

27. The drilling motor assembly of claim 22, wherein the drilling motor comprises a turbine drilling motor.

28. The drilling motor assembly of claim 22, wherein the pawl has an axis of rotation about the pivot pin, and a generally planar engagement face which engages a generally planar engagement face of the recess when relative rotation between the housing and the mandrel is prevented, and wherein the engaged pawl and recess engagement faces are oriented at an oblique angle relative to a radius extending from the axis of rotation to the engaged pawl and recess engagement faces.

29. The drilling motor assembly of claim 28, wherein the pawl and the recess are engagable such that relative rotation between the housing and the mandrel is permitted in one direction, but is prevented in an opposite direction.

30. The drilling motor assembly of claim 28, wherein the oblique angle is greater than 90 degrees relative to the radius and the engagement faces of the pawl and recess such that when the pawl and recess engagement faces are engaged, the pawl is prevented from disengaging from the recess.

31. The drilling motor assembly of claim 22, wherein predetermined mating surfaces of the drilling motor assembly are hardened to at least approximately 400 Brinell hardness.

* * * * *